United States Patent
Yoon et al.

(10) Patent No.: US 11,343,736 B2
(45) Date of Patent: May 24, 2022

(54) METHOD AND DEVICE FOR PERFORMING HANDOVER IN WIRELESS COMMUNICATION SYSTEM

(71) Applicant: LG ELECTRONICS INC., Seoul (KR)

(72) Inventors: Sukhyon Yoon, Seoul (KR); Hyunsoo Ko, Seoul (KR); Kijun Kim, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 16/766,669

(22) PCT Filed: Nov. 23, 2018

(86) PCT No.: PCT/KR2018/014504
§ 371 (c)(1),
(2) Date: May 22, 2020

(87) PCT Pub. No.: WO2019/103517
PCT Pub. Date: May 31, 2019

(65) Prior Publication Data
US 2020/0367125 A1 Nov. 19, 2020

Related U.S. Application Data

(60) Provisional application No. 62/590,350, filed on Nov. 23, 2017.

(51) Int. Cl.
*H04W 36/08* (2009.01)
*H04W 36/30* (2009.01)
*H04W 36/00* (2009.01)
*H04W 36/38* (2009.01)
*H04W 74/00* (2009.01)

(52) U.S. Cl.
CPC ....... *H04W 36/08* (2013.01); *H04W 36/0072* (2013.01); *H04W 36/305* (2018.08); *H04W 36/38* (2013.01); *H04W 74/004* (2013.01)

(58) Field of Classification Search
CPC .............. H04W 36/08; H04W 36/305; H04W 36/0072; H04W 36/38; H04W 74/004; H04W 16/28
See application file for complete search history.

(56) References Cited

U.S. PATENT DOCUMENTS

| | | | |
|---|---|---|---|
| 2014/0355569 A1 | 12/2014 | Chun et al. | |
| 2018/0206170 A1* | 7/2018 | Nagaraja | H04B 7/0408 |
| 2018/0368126 A1* | 12/2018 | Islam | H04L 5/1469 |
| 2019/0037604 A1* | 1/2019 | Akkarakaran | H04W 74/006 |
| 2021/0083747 A1* | 3/2021 | Zhou | H04W 52/50 |

OTHER PUBLICATIONS

Intel Corporation, "NR Random Access Procedure," 3GPP TSG-RAN WG1 #90, R1-1712532, Aug. 2017, 8 pages.

(Continued)

*Primary Examiner* — Magdi Elhag
(74) *Attorney, Agent, or Firm* — Lee Hong Degerman Kang Waimey

(57) ABSTRACT

Disclosed are a method and a device for performing a handover in a wireless communication system.

9 Claims, 17 Drawing Sheets

(56) References Cited

OTHER PUBLICATIONS

Qualcomm Incorporated, "PRACH Procedure Consideration," 3GPP TSG-RAN WG1 #90bis, R1-1718532, Oct. 2017, 13 pages.
Huawei, et al., "Beam selection during handover," 3GPP TSG-RAN WG2 #99bis, R2-1710263, Oct. 2017, 5 pages.
Huawei, et al., "Allocation of appropriate RACH resources for handover," 3GPP TSG-RAN WG2 #99bis, R2-1710273, Oct. 2017, 6 pages.
PCT International Application No. PCT/KR2018/014504, Written Opinion of the International Searching Authority dated Mar. 7, 2019, 29 pages.

* cited by examiner (a)  (b)

METHOD AND DEVICE FOR PERFORMING HANDOVER IN WIRELESS COMMUNICATION SYSTEM

CROSS-REFERENCE TO RELATED APPLICATIONS

This application is the National Stage filing under 35 U.S.C. 371 of International Application No. PCT/KR2018/014504, filed on Nov. 23, 2018, which claims the benefit of U.S. Provisional Application No. 62/590,350, filed on Nov. 23, 2017, the contents of which are all hereby incorporated by reference herein in their entirety.

TECHNICAL FIELD

The present disclosure relates to a wireless communication system, and more particularly, to a method and device for performing handover.

BACKGROUND ART

As many more communication devices have required higher communication capacity, the necessity of the enhanced mobile broadband (eMBB) communication much improved than the legacy radio access technology (RAT) has increased. In addition, massive machine type communication (mMTC) capable of providing various services at anytime and anywhere by connecting a number of devices or objects to each other has been considered in the next generation communication system.

Moreover, a communication system design capable of supporting services/UEs sensitive to reliability and latency has been discussed. The introduction of the next generation RAT considering the eMBB communication, mMTC, Ultra-reliable and low latency communication (URLLC), and the like has been discussed.

DISCLOSURE

Technical Problem

There is a need for a method for more efficiently performing handover in a wireless communication system.

There is a need for a method for more efficiently using resources for performing handover in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for performing handover by a user equipment (UE) in a wireless communication system may include receiving a handover command from a first base station, transmitting a message related to the handover to a second base station based on a resource allocated for beam recovery in response to the handover command, and performing communication with the second base station based on a beam determined based on the message related to the handover.

According to an embodiment, the message related to the handover may contain at least one of beam update information or a random access channel (RACH) signal for the handover.

According to an embodiment, based on containing the beam update information by the message related to the handover, the transmitting of the message related to the handover may include transmitting the RACH signal for the handover to the second base station, receiving a RACH response for the handover from the second base station, and transmitting the beam update information to the second base station based on the resource allocated for the beam recovery.

According to an embodiment, the RACH signal for the handover may be transmitted based on one of one or more resources allocated for the handover and the resource allocated for the beam recovery.

According to an embodiment, the one or more resources allocated for the handover may include at least one of a contention-free based RACH resource or a contention-based RACH resource.

According to an embodiment, the response message for the handover may be transmitted based on a resource having a lowest handover delay among the one or more resources allocated for the handover and the resource allocated for the beam recovery.

According to an embodiment, the beam update information may include information about a beam having a better quality than a beam indicated by the RACH signal for the handover.

According to an embodiment, the method may further include performing communication with the second base station based on a beam determined based on the beam update information.

According to an embodiment, the handover may be performed through a contention-free based RACH procedure.

According to an embodiment, the resource allocated for the beam recovery may include a random access channel (RACH) resource for the beam recovery.

According to an embodiment, the resource allocated for the beam recovery may be allocated as a UE dedicated resource through the handover command.

The method may further include receiving, from the first base station, information indicating whether the resource allocated for the beam recovery is available for transmitting the message related to the handover.

In another aspect of the present disclosure, an apparatus for performing handover in a wireless communication system may include a memory and a processor connected to the memory, wherein the processor is configured to receive a handover command from a first base station, transmit a message related to the handover to a second base station based on a resource allocated for beam recovery in response to the handover command, and perform communication with the second base station based on a beam determined based on the message related to the handover.

Advantageous Effects

According to the present disclosure, handover may be more efficiently performed in a wireless communication system.

According to the present disclosure, resources for performing handover may be more efficiently used.

According to the present disclosure, handover may be performed more quickly.

It will be appreciated by persons skilled in the art that that the effects that may be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
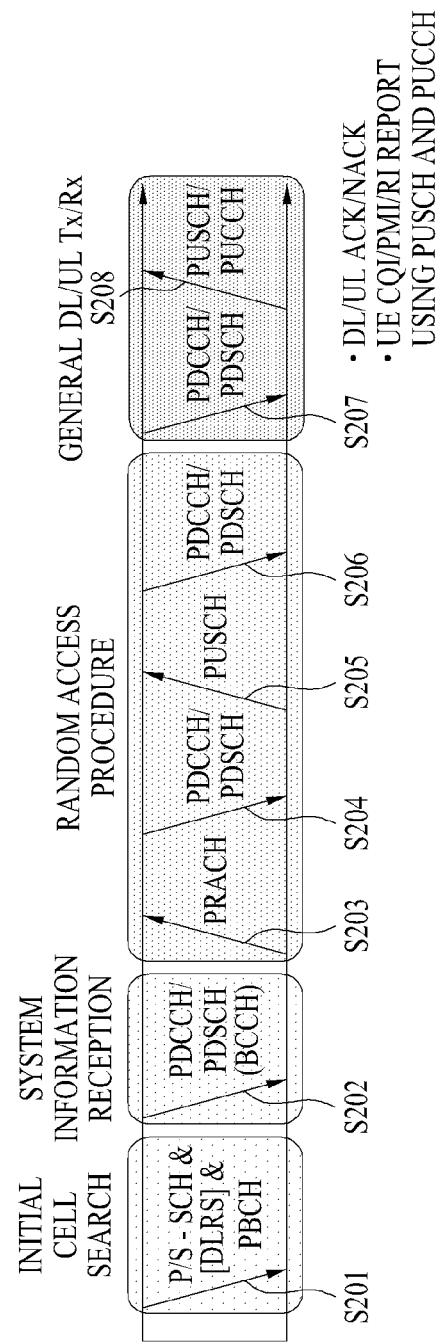
FIG. 1 is a view illustrating physical channels and a general signal transmission method using the physical channels in a 3GPP system.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The detailed description, which will be given below with reference to the accompanying drawings, is intended to explain exemplary embodiments of the present disclosure, rather than to show the only embodiments that may be implemented according to the disclosure.

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

Terms to be used in this application are defined as follows.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device.

In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). Specifically, a base station (BS) of UTRAN will hereinafter be referred to as Node-B, a base station (BS) of E-UTRAN will hereinafter be referred to as eNB, and a base station (BS) of a new radio access technology network will hereinafter be referred to as gNB.

Techniques, devices, and systems described herein may be used in various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Multi-Carrier Frequency Division Multiple Access (MC-FDMA), etc.

CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA), etc.

UTRA is a part of Universal Mobile Telecommunication System (UMTS) and 3rd Generation Partnership Project (3GPP) Long Term Evolution (LTE) is a part of Evolved UMTS (E-UMTS) using E-UTRA. 3GPP LTE employs OFDMA for downlink and SC-FDMA for uplink. LTE-A is an evolution of 3GPP LTE. For the sake of clarity, it is assumed that the present disclosure is applied to 3GPP communication systems, for example, LTE/LTE-A systems, NR (New Radio Access Technology) system, etc. However, the technical features of the present disclosure are not limited thereto. For example, while the following detailed description is given under the assumption that a 3GPP communication system is being used as a mobile communication system, the description is applicable to any other mobile communication system except for specific features inherent to the 3GPP LTE/LTE-A/NR systems.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals.

An RS is a signal with a predefined special waveform known to both a gNode B (gNB) and a UE, and may also be referred to as a pilot. For example, cell specific RS, UE-specific RS (UE-RS), positioning RS (PRS), and channel state information RS (CSI-RS) are defined as DL RSs.

The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal.

In the present disclosure, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

For the terms and techniques which are used herein but not specifically described, 3GPP LTE/LTE-A standard documents, for example, 3GPP TS 36.211, 3GPP TS 36.212, 3GPP TS 36.213, 3GPP TS 36.321 and 3GPP TS 36.331 may be referenced, and 3GPP NR standard documents, for example, 3GPP TS 38.211, 3GPP TS 38.212, 3GPP 38.213, 3GPP 38.214, 3GPP 38.215, 3GPP TS 38.321 and 3GPP TS 38.331 may also be referenced.

FIG. 1 illustrates physical channels and a general method for transmitting signals on the physical channels in the 3GPP system.

Referring to FIG. 1, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed. As described above, the introduction of the next generation RAT considering the enhanced mobile broadband communication, massive MTC, Ultra-reliable and low latency communication (URLLC), and the like has been discussed.

In the current 3GPP, many developers and companies are conducting intensive research into the next generation mobile communication system after EPC. The next generation mobile communication system after EPC may be referred to as a new RAT (NR) system, a 5G RAT system, or a 5G system. For convenience of description, the next generation mobile communication system after EPC will hereinafter be referred to as an NR system.

Higher and superior performances better than those of the legacy 4G system in terms of a data rate, capacity, latency, energy consumption, and energy costs should be supplied to the NR system. Therefore, it is necessary for the NR system to be significantly evolved in various fields, i.e., a bandwidth, spectral, energy, signaling efficiency, and cost-per-bit reduction.

The NR system may use the OFDM transmission scheme or other similar transmission methods. For example, the NR system may use numerologies shown in the following Table 1.

TABLE 1

| Parameter | Value |
| --- | --- |
| Subcarrier-spacing (Δf) | 60 kHz |
| OFDM symbol length | 16.33 us |
| Cyclic Prefix(CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

As another example, the NR system may select and use one of a plurality of OFDM numerologies shown in Table 2 below.

TABLE 2

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 us/4.69 us | 2.60 us/2.34 us | 1.30 us/1.17 us | 6.51 us/5.86 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

Referring to Table 2, OFDM numerologies having sub-carrier spacings of 30, 60, and 120 kHz, which are multiples of 15 kHz, may be used based on a subcarrier spacing of 15 kHz used in the LTE system. The cyclic prefix (CP) length, system bandwidth (BW), number of available subcarriers, subframe length, and number of OFDM symbols per subframe, shown in Table 2, are merely examples and the present disclosure is not limited to the examples represented in Table 2. For example, for the 60 kHz subcarrier spacing, the system BW may be set to 100 MHz and the number of available subcarriers may have a value greater than 1500 and less than 1666.

The NR system may be based on OFDM parameters of the LTE system and other parameters. Alternatively, the NR system may be based on numerologies of the legacy LTE/LTE-A without change, and may have a larger system bandwidth (e.g., 100 MHz) as compared to the legacy LTE/LTE-A. In addition, the NR system may allow one cell to support a plurality of numerologies. That is, in the NR system, UEs operating in different numerologies may coexist in one cell.

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

Figure 2:
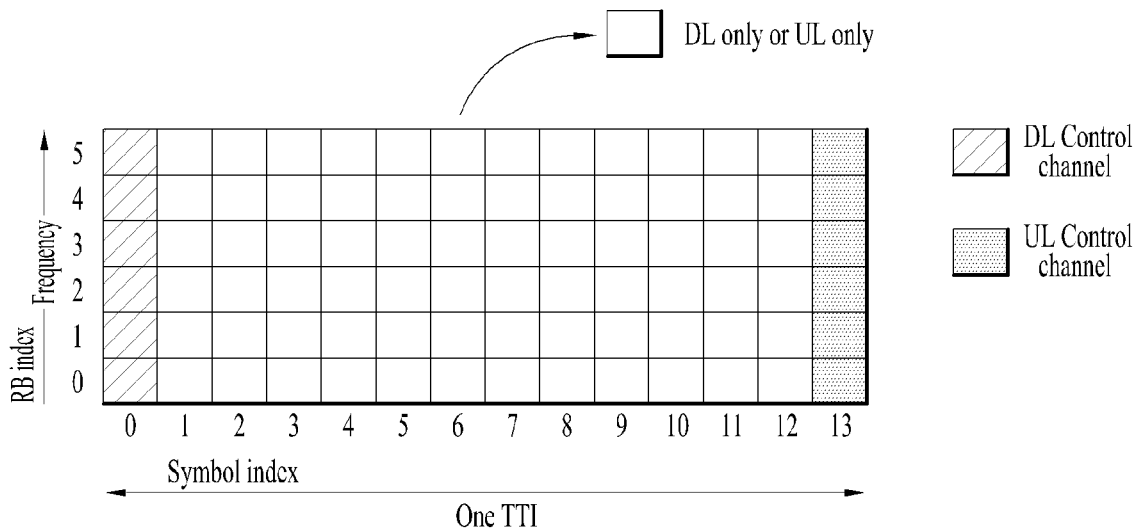
FIG. 2 is a view illustrating an exemplary slot structure available in new radio access technology (NR).

FIG. 2 illustrates an exemplary slot structure available in the new radio access technology (NR).

In the NR system, a slot structure illustrated in FIG. 2 may be used to minimize data transmission latency. The slot structure illustrated in FIG. 2 may also be referred to as a self-contained subframe structure.

Referring to FIG. 2, a hatched area represents a DL control region and a black area represents a UL control region. For example, the hatched area may represent a PDCCH transmission region for carrying DCI. The DCI is control information that a gNB transmits to a UE. The DCI may include, but is not limited to, information about cell configuration that the UE should know, DL specific information such as DL scheduling, and UL specific information such as UL grant. The black area may represent a PUCCH transmission region for carrying UCI. The UCI is control information that the UE transmits to the gNB. The UCI may include, but is not limited to, HARQ ACK/NACK information on DL data, CSI information about a DL channel status, and a scheduling request (SR).

In FIG. 2, an area having no mark (e.g., a symbol region from symbol index 1 to symbol index 12) may be used for transmission of a physical channel (e.g., a PDSCH) carrying DL data or may be used for transmission of a physical channel (e.g., PUSCH) carrying UL data. Referring to FIG. 2, DL transmission and UL transmission take place sequentially in one slot, and transmission/reception of DL data and reception/transmission of a UL ACK/NACK for the DL data may be performed in the one slot. Therefore, when an error is generated during data transmission, a time taken for a data retransmission may be reduced, thereby minimizing the delay of a final data transmission.

In slot structure illustrated in FIG. 2, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the NR system, a basic transmission unit is a slot. A slot duration includes 14 symbols each having a normal cyclic prefix (CP), or 12 symbols each having an extended CP. In addition, a slot is scaled in time by a function of a used subcarrier spacing.

For an NR system under discussion, a technique of using an ultra-high frequency band (for example, a frequency band at or above 6 GHz) is considered in order to transmit data to a plurality of users at a high transmission rate in a wide frequency band. However, the ultra-high frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction may be produced in a total band. Hybrid BF stands between digital BF and analog BF, in which B TXRUs fewer than Q antenna elements are used. In hybrid BF, the directions of beams transmittable at the same time are limited to or below B although the number of beam directions is different according to connections between B TXRUs and Q antenna elements.

Figure 3:
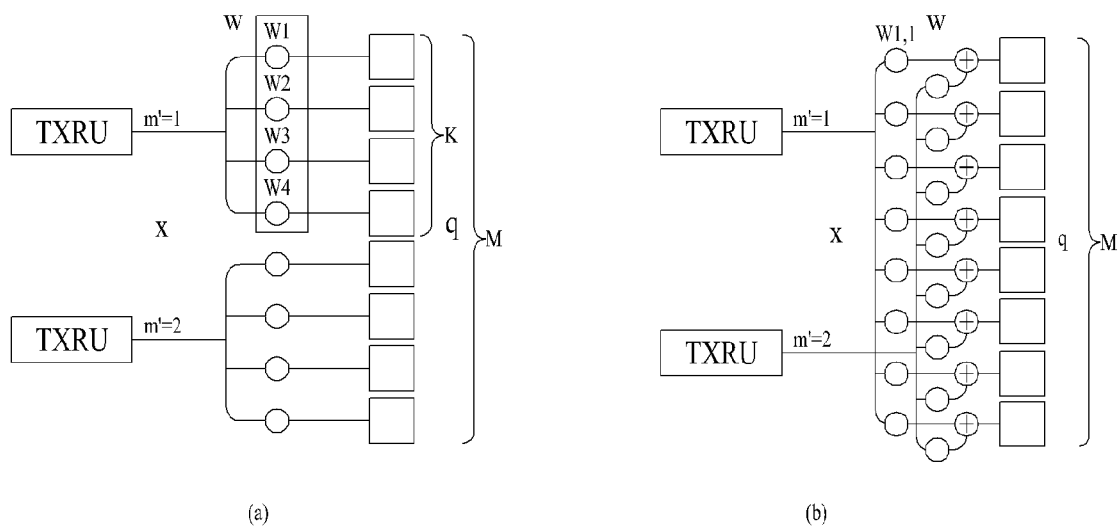
FIG. 3 is a view illustrating exemplary connection schemes between transceiver units (TXRUs) and antenna elements.

FIG. 3 is a view illustrating exemplary connection schemes between TXRUs and antenna elements.

Figure 4:
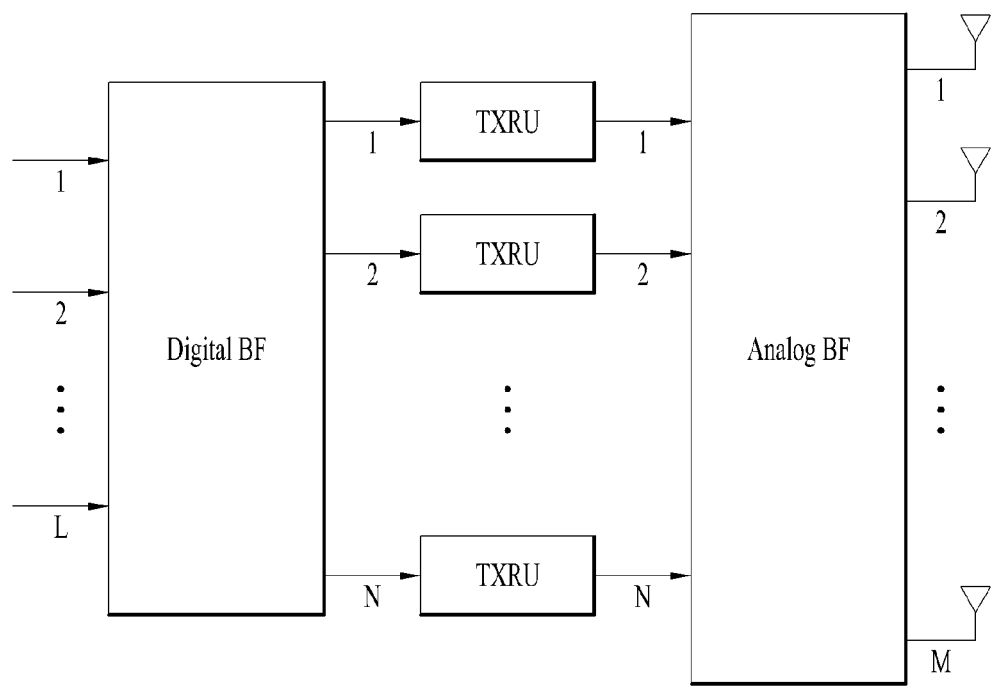
FIG. 4 is a view abstractly illustrating a hybrid beamforming structure in terms of TXRUs and physical antennas.

(a) of FIG. 3 illustrates connection between a TXRU and a sub-array. In this case, an antenna element is connected only to one TXRU. In contrast, (b) of FIG. 4 illustrates connection between a TXRU and all antenna elements. In this case, an antenna element is connected to all TXRUs. In FIG. 3, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

FIG. 4 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 4, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered.

In the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 5:
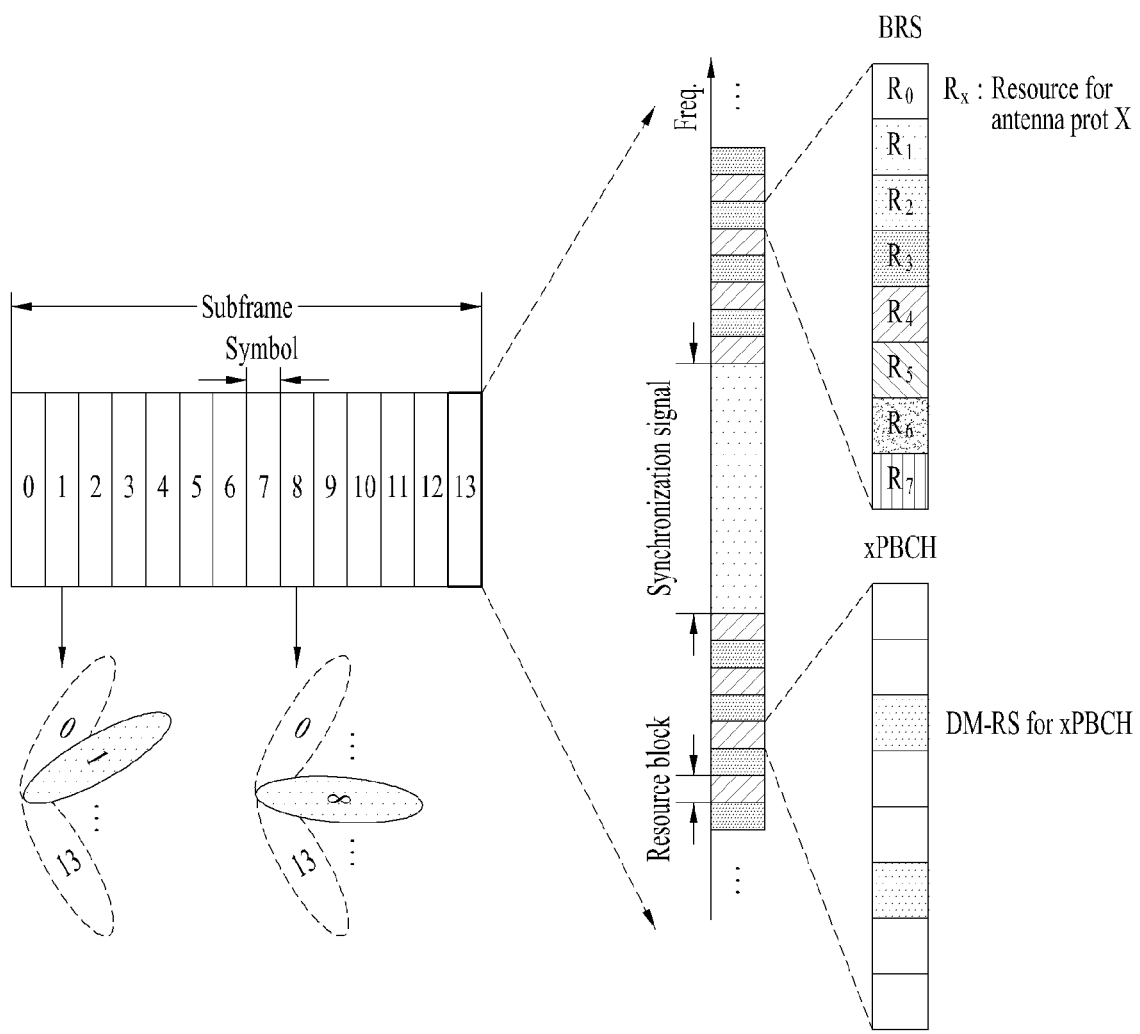
FIG. 5 illustrates a beam sweeping operation performed in a downlink signal transmission process in an NR system.

FIG. 5 illustrates a beam sweeping operation performed in a DL signal transmission process in an NR system.

Referring to FIG. 5, a process of transmitting an SS and system information is illustrated as an example of DL signal transmission. In FIG. 5, an xPBCH may mean a physical resource (or physical channel) over which system information of the NR system is broadcasted.

Analog beams belonging to different antenna panels may be simultaneously transmitted in one symbol. In this case, in order to measure a channel per analog beam, as illustrated in FIG. 5, the introduction of a beam reference signal (BRS), which is a reference signal (RS) to which a single analog beam corresponding to a specific antenna panel is applied, has been discussed. The BRS may be defined for a plurality of antenna ports and each antenna port of the BRS may correspond to a single analog beam. In this case, unlike the BRS, all analog beams in an analog beam group may be applied to the SS or xPBCH to assist a random UE in correctly receiving the SS or xPBCH.

Figure 6:
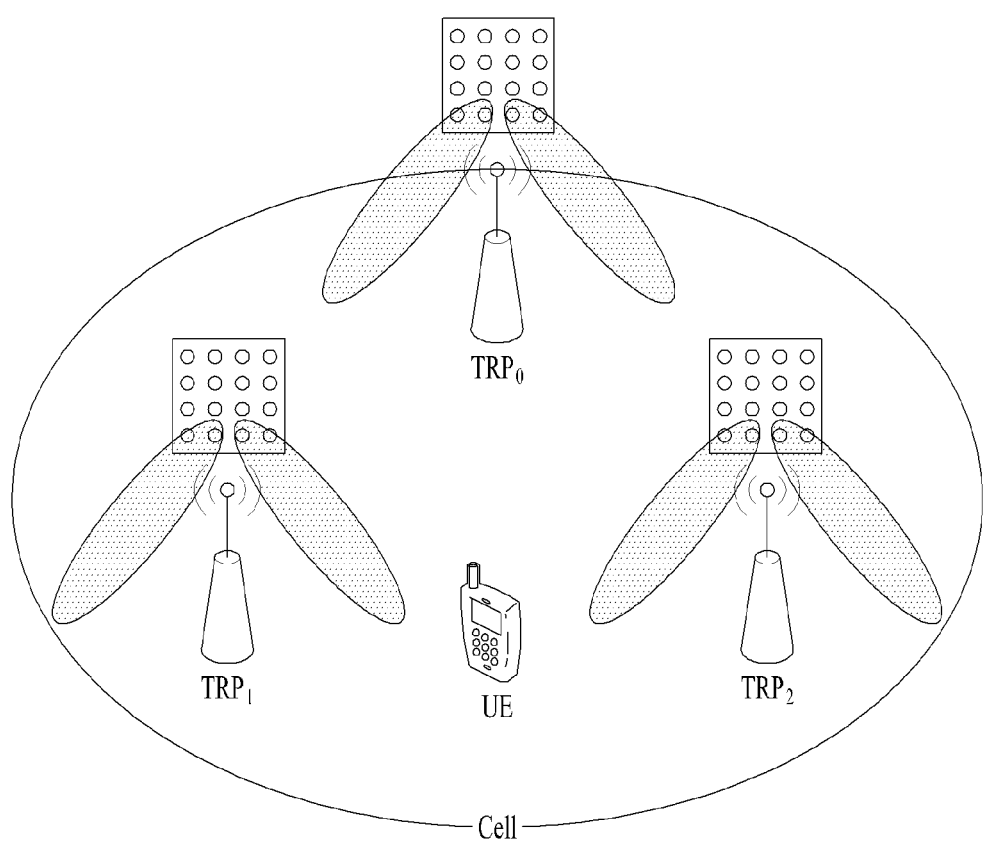
FIG. 6 is a view illustrating an exemplary cell in an NR system.

FIG. 6 is a view illustrating an exemplary cell in the NR system.

Referring to FIG. 6, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system.

Radio Resource Management (RRM) Operation of LTE System

The LTE system supports RRM operations including power control, scheduling, cell search, cell reselection, handover, radio link or connection monitoring, and connection establishment/re-establishment. In this case, a serving cell may request that the UE send RRM measurement information corresponding to a measurement value for performing an RRM operation. For example, in the LTE system, typically, the UE may measure cell search information, reference signal received power (RSRP), reference signal received quality (RSRQ), etc., for each cell and then report the measured information to the eNB. In the LTE system, the UE receives 'measConfig' as a higher layer signal for RRM measurement from the serving cell and measures RSRP or RSRQ based on the received information of 'measConfig'. In this case, RSRP and RSRQ have been defined in the specification of TS 36.214 of the LTE system.

In the case of intra-frequency measurement, the UE operating in the LTE system may measure RSRP in bandwidth corresponding to one of 6, 15, 25, 50, 75, and 100 RBs transmitted through allowed measurement bandwidth information (e.g., AllowedMeasBandwidth information element (IE)). The allowed measurement bandwidth information may be transmitted in system information block type 3 (SIB3).

In the case of inter-frequency measurement, the UE may measure RSRP in bandwidth corresponding to one of 6, 15, 25, 50, 75, and 100 RBs transmitted through the allowed measurement bandwidth information (e.g., AllowedMeasBandwidth IE). The allowed measurement bandwidth information may be transmitted in system information block type 5 (SIB5). When the allowed measurement bandwidth information is not present, the UE may measure RSRP in the entire DL system frequency band.

Upon receiving the allowed measurement bandwidth information, the UE may regard the value of the allowed measurement bandwidth information as a maximum measurement bandwidth and freely measure RSRP within the maximum measurement bandwidth. However, if the serving cell transmits an IE defined as a wide band RSRQ (WB-RSRQ) and sets the allowed measurement bandwidth to 50 RBs or more, the UE needs to calculate RSRP for the entire allowed measurement bandwidth. Meanwhile, a received signal strength indicator (RSSI) is measured in a frequency bandwidth of a receiver of the UE according to definition of an RSSI bandwidth.

For inter-frequency or inter-RAT measurement, in the LTE system, a measurement gap for performing measurement by the UE may be defined. During the measurement gap, the UE may stop communication with the serving cell and perform inter-frequency or inter-RAT measurement.

Referring to the specification of 36.133, when the UE requires the measurement gap in order to identify and measure inter-frequency and/or inter-RAT cells, E-UTRAN should provide one measurement gap pattern having a predetermined gap duration in order to simultaneously monitor all frequency layers and RATs. Table 3 below shows gap pattern configuration supported by the UE in the LTE system.

TABLE 3

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD GERAN. LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

Referring to Table 3, when a gap pattern Id is 0, the UE may monitor frequencies other than frequencies of the serving cell for 6 ms in units of a 40 ms period and, when the gap pattern Id is 1, the UE may monitor frequencies other than frequencies of the serving cell for 6 ms in units of an 80 ms period. For a preset time of 6 ms, the BS may not allocate a resource to the UE or transmit traffic to the UE and the UE may search for an available frequency signal for handover by measuring frequencies other than frequencies of the serving cell. During a measurement gap interval, the UE transmits no data. In addition, during the measurement gap interval, the UE does not tune a receiver of the UE in E-UTRAN subcarriers of a primary cell (PCell) and all secondary cells (SCells) and E-UTRAN subcarriers of the PCell and a primary secondary cell (PSCell). If the measurement gap of 6 ms is ended, the UE monitors the frequencies of the serving cell again.

RACH Preamble Detection

A RACH signal used for initial access in the LTE system and the NR system is configured as follows.

Cyclic prefix (CP): The CP serves to prevent interference from a previous symbol and to arrange RACH preamble signals received with various time delays in the same time interval. In general, the length of the CP may be set equal to or greater than the maximum round trip delay time.

Preamble: A sequence used for a base station to detect the transmission of a RACH signal is defined, and the preamble serves to transmit the sequence.

Guard time: A period defined in order to prevent a signal received with a delay from the farthest place in the RACH coverage from interfering with a signal received after the RACH symbol period. No signal may be defined in the guard time because the UE does not transmit any signal during the guard time FIG. 7 is a diagram illustrating an operation performed by a base station to receive a RACH signal.

The UE may receive a synchronization signal and transmit a RACH signal through a designated RACH resource according to the system timing of a BS acquired from the received synchronization signal.

Figure 7:
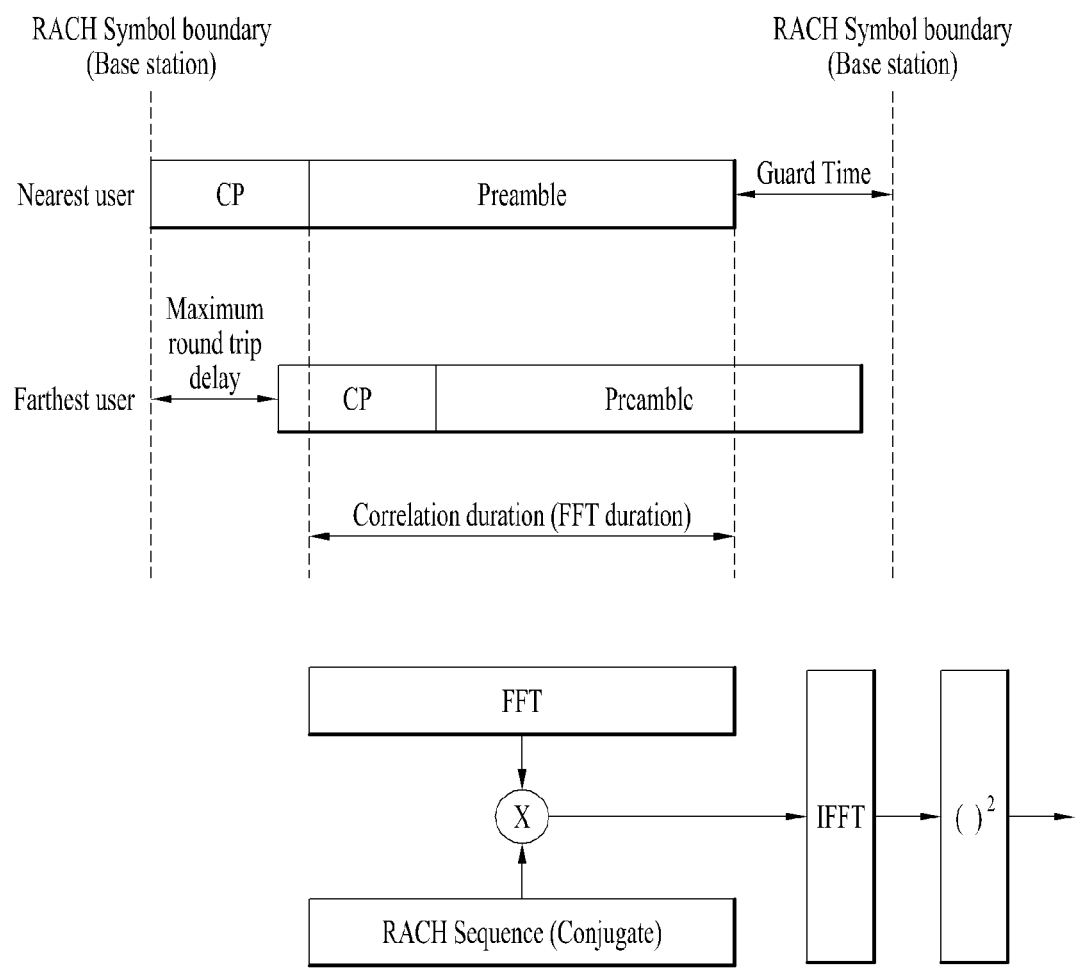
FIG. 7 is a diagram illustrating an operation performed by a base station to receive a RACH signal.

Referring to FIG. 7, a base station, which receives signals from multiple users, sets a CP for the RACH signal to the maximum round trip delay time or more, and accordingly any point between the maximum round trip delay time and the CP length may be set as a boundary for receiving the RACH signal. The base station may determine the set boundary point as a starting point for receiving the RACH signal and calculate a correlation for a signal corresponding to the sequence length from the determined starting point to acquire an indication of presence of the RACH signal and time delay information.

When a communication environment operated by the base station uses multiple beams, such as a millimeter band, the base station changes beam directions to detect a RACH preamble for RACH signals received in multiple directions. When an analog beam is used, the base station may receive a RACH signal for only one direction at a time. Accordingly, in order to properly perform RACH preamble detection, the RACH preamble and a RACH procedure need to be designed. In the present disclosure, description will be made considering only a process in which beam correspondence (BC) information of the base station is valid and a process in which the information is invalid.

Figure 8:
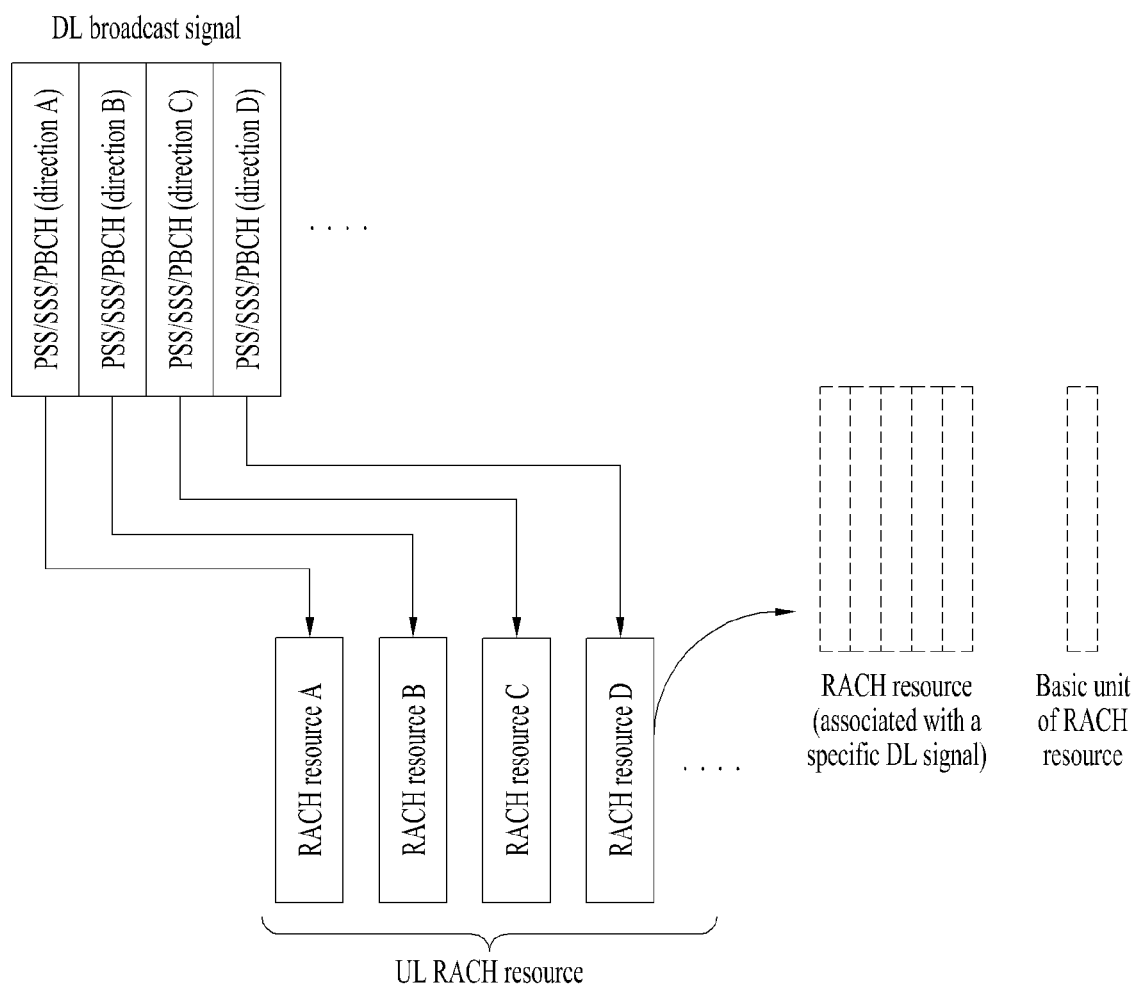
FIG. 8 is a diagram illustrating synchronization signal blocks and allocation of RACH resources linked to the synchronization signal blocks.

FIG. 8 is a diagram illustrating synchronization signal blocks and allocation of RACH resources linked to the synchronization signal blocks.

Referring to FIG. 8, each synchronization signal (SS) block is linked to a specific RACH resource.

Figure 9:
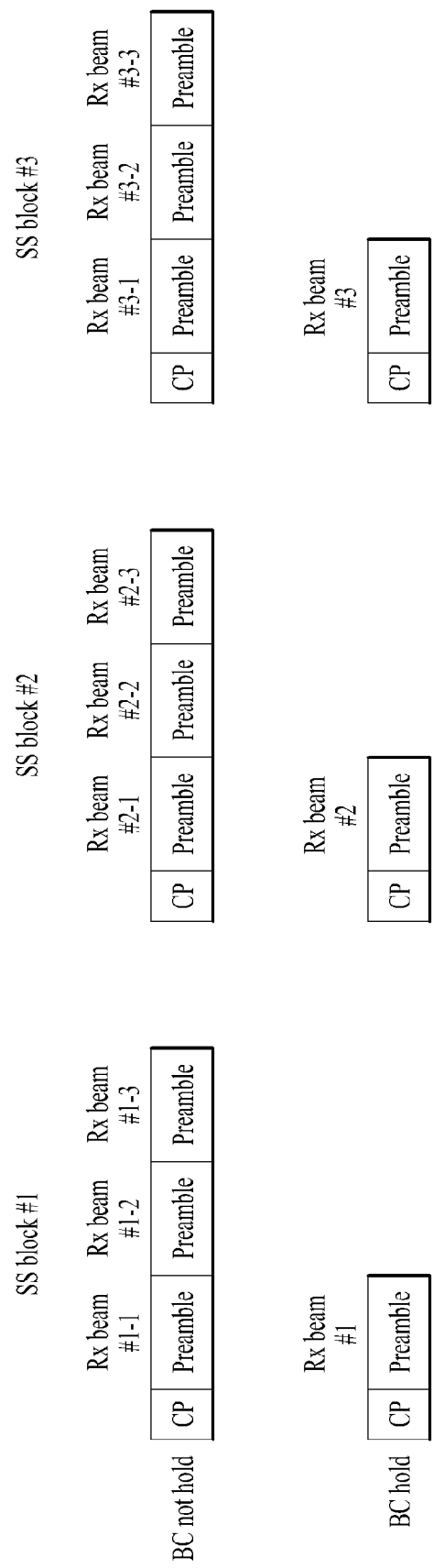
FIG. 9 is a diagram illustrating an example of forming a reception beam for receiving a RACH preamble according to whether a beam correspondence (BC) is valid.

FIG. 9 is a diagram illustrating an example of forming a reception beam for receiving a RACH preamble according to whether BC information is valid.

Referring to FIG. 9, as described above, RACH resources are linked to SS blocks. When the beam correspondence information is valid, the base station forms a received beam in the beam direction used to transmit the SS block for one RACH resource, and detects the RACH preamble only in the direction in which the received beam is formed.

If the BC information is not valid, the beam direction may be shifted even when a RACH resource is linked to an SS block and the base station forms a received beam in the beam direction used for transmission of the SS block. Accordingly, the base station performs RACH preamble detection (beam scanning) in multiple directions.

Handover Through Contention-Based RACH Procedure

Figure 10:
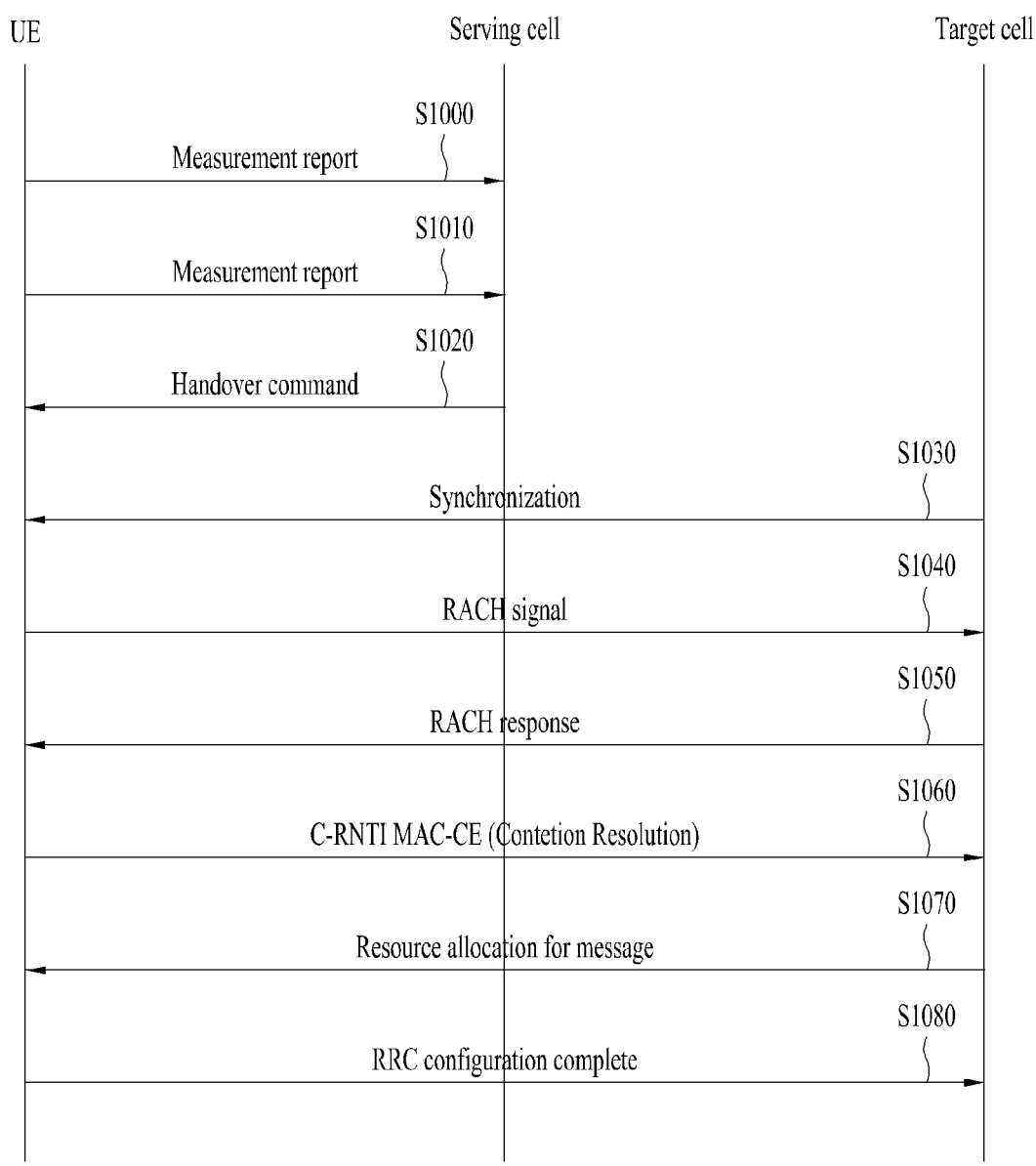
FIG. 10 illustrates performing handover through a contention-based RACH procedure.

FIG. 10 illustrates performing handover through a contention-based RACH procedure.

As the UE moves, the mobile communication system performs handover to change a serving cell such that the communication is not disconnected and the service is continuously provided.

Referring to FIG. 10, in S1000 and S1010, the UE transmits a measurement report (MR) to the serving cell. The UE may measure a cell-specific RSRP/RSRQ and transmit a measurement report including information on the measured cell-specific RSRP/RSRQ to the serving cell.

In S1020, the serving cell may transmit a handover command including a target cell and target cell-related information to the UE.

In response to the handover command received from the serving cell, the UE may establish synchronization with the target cell (S1030), and transmit a RACH signal for handover to the target cell (S1040) to perform a RACH procedure with the target cell.

The target cell may transmit a RACH response to the UE in response to the RACH signal received from the UE (S1050), and the UE may transmit a cell-radio network temporary identifier MAC-control element (C-RNTI MAC-CE) for contention resolution to the target cell (S1060).

In response to the C-RNTI MAC CE received from the UE, the target cell may allocate a resource for data transmission to the UE (S1070). The UE may transmit, to the target cell, a message indicating that the handover is completed (e.g., an RRC configuration complete message) (S1080).

Handover Through Contention-Free RACH

1) Single beam scenario: The base station may perform handover through a contention-free RACH procedure to reduce a processing delay that occurs in the process of handover through the contention-based RACH procedure.

Figure 11:
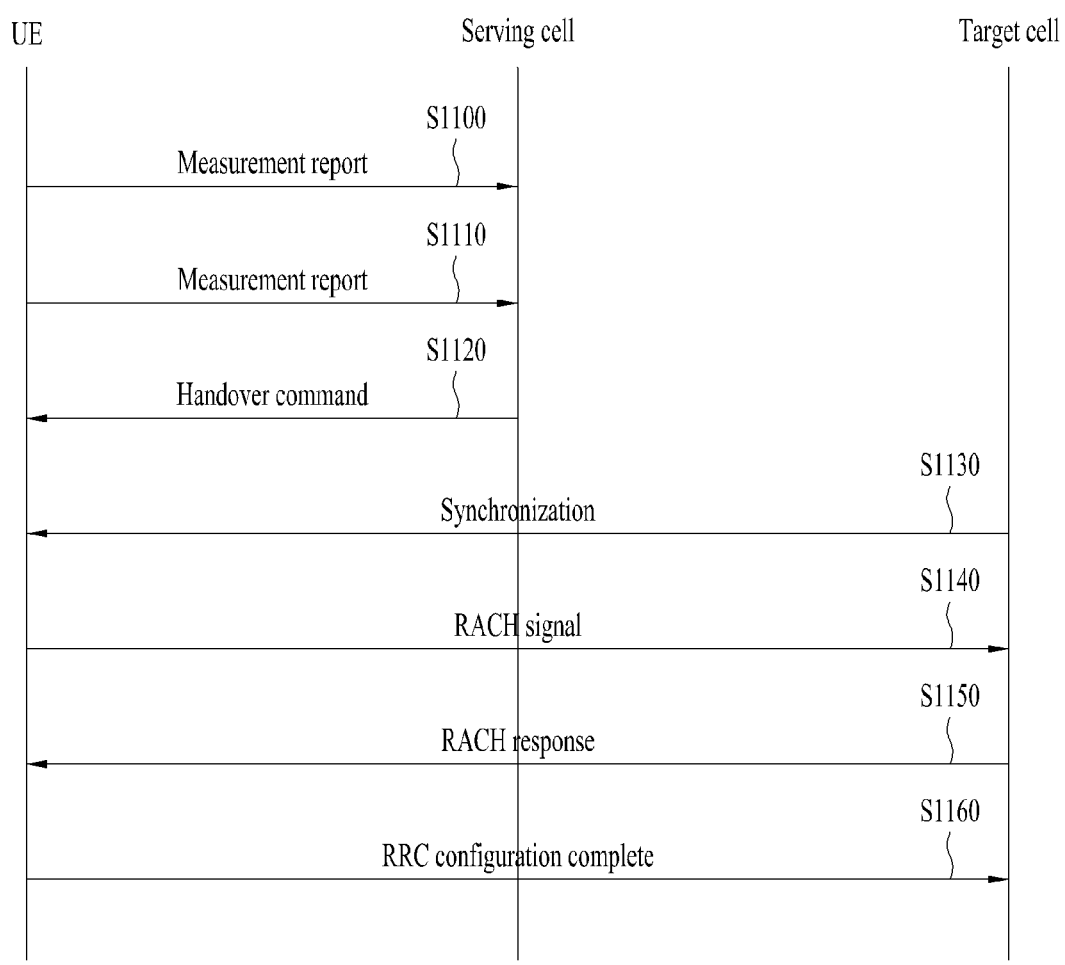
FIG. 11 illustrates performing handover using a contention-free RACH.

FIG. 11 illustrates performing handover using a contention-free RACH.

Referring to FIG. 11, the UE may transmit a measurement report including cell-specific RSRP/RSRQ to the serving cell (S1100, S1110), and the serving cell may transmit, to the UE, a handover command including information about a target cell to which the UE is to move through handover (S1120).

Then, in response to the handover command received from the serving cell, the UE may establish synchronization with the target cell (S1130) and transmit a RACH signal to the target cell (S1140) to perform a RACH procedure with the target cell.

The target cell may transmit a RACH response to the UE in response to the RACH signal received from the UE (S1150), and the UE may transmit an RRC configuration complete message to the target cell (S1160) to announce that handover is completed.

The contention-free RACH procedure does not use a common resource, but uses a dedicated resource to transmit the RACH signal. Accordingly, as shown in FIG. 11, the contention-free RACH procedure does not require any of RACH signal retransmission and contention resolution, which are caused by resource collision with other users, and therefore the time required to complete the handover operation may be reduced.

2) Multi-beam scenario: In the handover operation, the UE acquires a timing advance (TA) value for uplink transmission through the RACH response, transmits, to the target cell, a handover complete message for the handover command received from the source cell (or serving cell), and then terminates the handover operation. In addition, in a multi-beam environment, the UE may acquire a beam for the target cell through a RACH procedure. In the present disclosure, a method for acquiring a beam in a handover operation through a contention-free RACH procedure will be described. Hereinafter, a method for acquiring a beam by allocating multiple RACH resources and a method for acquiring a beam through a measurement report will be described in detail.

2-1) Beam Acquisition Through Allocation of Multiple RACH Resources: Hereinafter, a process of acquiring a beam in a handover operation in a multi-beam environment will be described. The handover operation through the contention-based RACH procedure is the same as the operation of acquiring an initial beams through RACH signal transmission. For example, in the handover operation, when the UE receives a handover command from the base station, the UE may transmit a RACH signal to the target cell. Before transmitting the RACH signal, the UE may determine an SS block, that is, a beam, that has the best channel quality by measuring the channel quality for each beam. In the present disclosure, the channel quality measurement for each beam may be referred to as channel quality measurement for an SS block. For example, an SS block may be used as a channel representing a beam, and a reference signal transmitted through a beam, such as CSI-RS, may also be used as a channel representing a beam.

As shown in FIG. 8, when an SS block having the optimum quality is determined with RACH resources configured for respective SS blocks, the base station may determine a RACH resource on which a RACH preamble is received, thereby identifying a downlink beam index determined by the UE.

Even in the handover operation through a contention-free RACH procedure, the UE may acquire a beam through multiple UE-dedicated RACH resources. Here, the multiple UE-dedicated RACH resources may each have a connection relationship with the best beam (or SS block), and the base station may inform the UE of the information about the connection relationship between the respective UE-dedicated RACH resources and the best beam.

In the case where handover is performed using channel quality information about a reference signal representing a beam positioned in a lower layer, such as CSI-RS, in the hierarchy as channel quality information for each beam, the base station should provide the UE with connection information between a CSI-RS representing a lower beam in the hierarchy and an SS block having a connection relationship with a RACH resource while representing a higher beam. The UE may use the information received from the base station in selecting a RACH resource. Then, the UE may connect to the base station through the beam selected by the UE by transmitting a RACH preamble using only the RACH resource related to the best beam. In an embodiment, the best beam may be referred to as the best quality beam, the best quality SS block, or an SS block linked to the best quality CSI.

However, the UE may transmit the RACH signal in multiple beam directions, and the base station may acquire a beam in a beam direction determined by reflecting UE load information for each beam. If a beam by which communication is impossible is allocated to the UE, communication may be interrupted. Accordingly, the base station may inform the UE of a condition for selecting a beam. For example, the base station may inform the UE of a threshold to allow the UE to select only a beam whose RSRP differs from the RSRP of the best beam by a value less than the threshold.

In allocating RACH resources for transmission of a RACH signal to the target cell through a handover command, the base station may allocate multiple RACH resources and deliver link information about SS blocks for each of the multiple RACH resources to the UE. Then, the UE may transmit a RACH signal through a RACH resource determined based on the result of measuring the channel quality for each SS block for the target cell or the channel quality measurement result of the previously measured SS block. The UE may acquire a downlink beam by transmitting the RACH signal and transmit downlink best beam information to the base station. Here, the channel quality information through the measurement report only needs to include channel quality information for each cell (or for each transmission unit for handover).

The handover operation through allocation of multiple RACH resources has a small signaling overhead because the UE only needs to transmit channel quality information for each cell to the base station. In addition, in the handover operation through allocation of multiple RACH resources, the UE selects the best beam after receiving a handover command, and therefore stability of beam acquisition and beam tracking may be enhanced. However, since the base station allocates multiple RACH resources, the waste of resources is large. Further, since a beam for receiving a RACH preamble is formed, the degree of freedom of scheduling of frequency resources other than the RACH resources may be lowered.

2-2) Beam acquisition through measurement report: Hereinafter, a method for preventing waste of resources from occurring in allocating multiple RACH resources as in Method 2-1) will be described. In order not to allocate multiple UE-dedicated RACH resources, information about a beam having the best quality between a UE and a base station should be valid in a step of determining a handover.

The UE may continuously measure channel quality for a neighbor cell. In general, RSRP or RSRQ may be used as measurement information for mobility. Hereinafter, for convenience of description, all information used for mobility measurement will be collectively referred to as RSRP.

In a multi-beam environment, the base station may transmit a signal for measuring channel quality to the UE using multiple beams per cell, and the UE may measure the channel quality for each beam using the signal received from the base station. In the NR system, in order to measure channel quality, a synchronization signal or PBCH, which will be referred to as an SS block for simplicity, may be used.

The UE may transmit cell-specific channel quality information together with cell-specific beam information to the base station based on the measured channel quality for each beam. Accordingly, the base station may determine the handover based on the beam information about the target cell, and may instruct the UE to handover to a specific beam of the target cell, using the beam information about the target cell. Accordingly, for handover, only one RACH resource (or resources fewer than the maximum number of beams of the target cell) rather than multiple resources may be allocated. For this operation, a few additional things should be considered.

A. Measurement report (MR) information: MR information may include RSRP for each cell, RSRP for each beam, and beam index information.

a) RSRP for each cell: In a multi-beam environment, channel quality measurement is basically performed for each beam. The RSRP for each cell may be defined in various forms using the RSRP for each beam. For example, it may be defined as a RSRP of the best beam, the best-N beam RSRP (the average RSRP of N cells with the best channel quality), the average RSRP of all beams above the threshold, or the like.

B) RSRP for each beam: In addition to the RSRP for each cell, a beam index included in a reported cell and RSRP for each beam may be included. In this case, the RSRP information for each beam may be defined as RSRP of all beams detected in the cell, RSRP of the best N beams among the beams detected in the cell, or the like.

C) Beam index: For the RSRP information for each beam, signaling overhead may be large. Accordingly, the MR information may not include RSRP for each beam, but include only a beam index. Here, the beam index may include a best beam index, a beam index used to calculate RSRP for each cell, and sorted indexes of the best-N beams.

B. Measurement report (MR) event: The communication system may define an MR event for transmitting a measurement report. The base station may deliver, to the UE, a threshold for triggering an MR event, and the UE may transmit a measurement report to the base station when the defined MR event takes place. In the present disclosure, an event using RSRP for each beam may be additionally defined. For example, the following events and parameters may be defined.

a) Event—the serving beam RSRP of the serving cell is less than a specific threshold;

b) Event—the best beam RSRP of the serving cell is less than a specific threshold;

c) Event—the best beam RSRP of the neighbor cell is greater than a specific threshold;

d) Event—the best beam RSRP of the neighbor cell is greater than the serving beam RSRP of the serving cell by a specific threshold or more; and e) Event—the best beam RSRP of the neighbor cell is greater than the best beam RSRP of the serving cell by a specific threshold or more.

RSRP for each beam may be a result of not applying L3 filtering, L1/L2 filtering, or filtering, and may be set by the base station in a similar manner to what is described below regarding a filtering coefficient.

In addition, a new event may be defined by combining the events defined in a) to e). And a threshold may be separately defined for each case. The threshold used to define an event may be set separately from the threshold used for RSRP for each cell, and a separate threshold may be set for each event. RSRP is a representative indicator of channel quality, and other quality indicators such as RSRQ and SNR may be used. In comparing a condition for triggering an event, if the channel for measuring the channel quality differs between the serving cell and the neighbor cell (for example, RSRP for the SS block of the neighbor cell and RSRP for the CSI-RS of the serving cell), a power offset for correcting the difference may be delivered by the base station to the UE or may be predefined.

C. Filtering coefficient: The UE may measure RSRP for each cell and check whether a condition for triggering an event is satisfied. When the change in RSRP for each cell is large, event triggering or handover may excessively frequently occur. Generally, in order to prevent the above-described issue, the UE performs filtering on RSRP, and the base station delivers a coefficient for filtering to the UE to ensure a stable operation of the system. When filtering is excessively long, a handover failure rate may increase due to a delay caused by the filtering. When filtering is excessively short, a handover ping-pong effect may occur.

To ensure the stable operation of the system, independent filtering coefficients may be used for RSRP for each cell and RSRP for each beam. For example, in the case of using multiple RSRPs as proposed in the present disclosure, long filtering may be used for RSRP for each cell, and short filtering may be used for RSRP for each beam to ensure stable beam acquisition based on the latest information. In order to use independent filtering coefficients for RSRP for each cell and RSRP for each beam, the base station may transmit multiple filtering coefficients to the UE. Alternatively, in the case of RSRP for each cell, the base station may deliver filtering coefficients. In the case of RSRP for each beam, the latest value may be used without filtering.

D. Power control: Since the base station informs the UE of a beam index for acquiring a downlink beam, the base station should deliver, to the UE, reference channel information for power control that is used for the UE to transmit a RACH signal. As a process for this operation, the UE uses a channel (e.g., an SS block, a CSI-RS, or the like) linked to a beam index of a target cell to be accessed when the base station performs handover, or the base station may directly indicate resource information about a specific reference channel (e.g., an SS block, a CSI-RS, or the like). At this time, if the beam is configured in a hierarchical structure, all base stations may deliver, to the UE, link information between the upper beam and the lower beam, and the channel linked to the upper or lower beam and the index directly indicated using the link information between the upper beam and the lower beam may be used as a reference channel for power control. Here, an additional measurement process for the upper or lower beam may be required, or pre-measured information may be used.

Scheme for Configuring RACH Resource

In configuring a RACH resource for transmitting a RACH preamble, only one RACH resource needs to be allocated at an appropriate time if the beam correspondence information is valid, and a beam is acquired through a measurement report according to Method 2-2). However, if the beam correspondence information is not valid, a RACH resource for beam sweeping of the UE or beam scanning of the base station should be configured. In this regard, 1) a case where beam sweeping is performed after beam scanning, or 2) a case where beam scanning is performed after beam sweeping may be considered.

Figure 12:
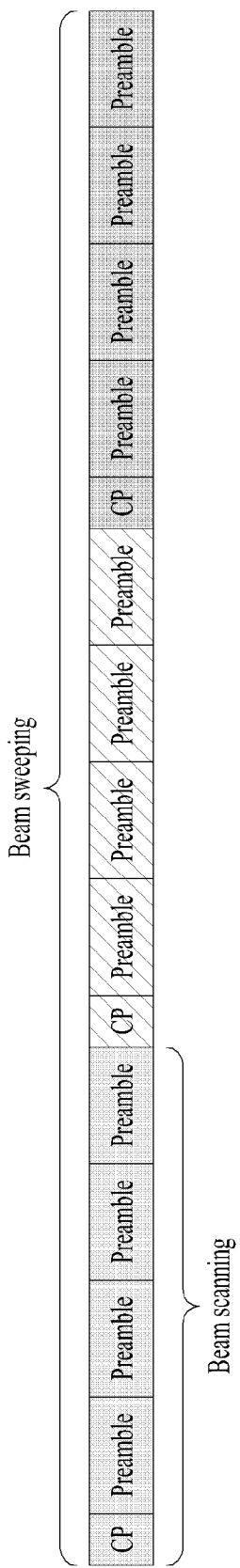
FIG. 12 is a diagram illustrating performing beam sweeping after beam scanning.

FIG. 12 is a diagram illustrating performing beam sweeping after beam scanning.

Referring to FIG. 12, when beam scanning is performed first, the UE may concatenate multiple RACH preambles without a CP and transmit the same. Then, the base station needs to receive the multiple RACH preambles while changing the direction of the reception beam during beam scanning. At this time, when the base station uses an analog beam, it is difficult for the base station to perform slot-based scheduling in a slot to which a RACH resource allocated to the UE is allocated. Accordingly, the base station may configure a mini slot in the slot to which the RACH resource is allocated, and perform scheduling on a mini slot basis.

Alternatively, since the beam scanning is performed because the beam correspondence information of the base station is not valid, the base station may allocate a UE-dedicated RACH resource by matching the time of a common RACH resource with the direction of the reception beam in a slot to which the common RACH resource is allocated, and inform the UE of the allocated UE-dedicated RACH resource.

Figure 13:
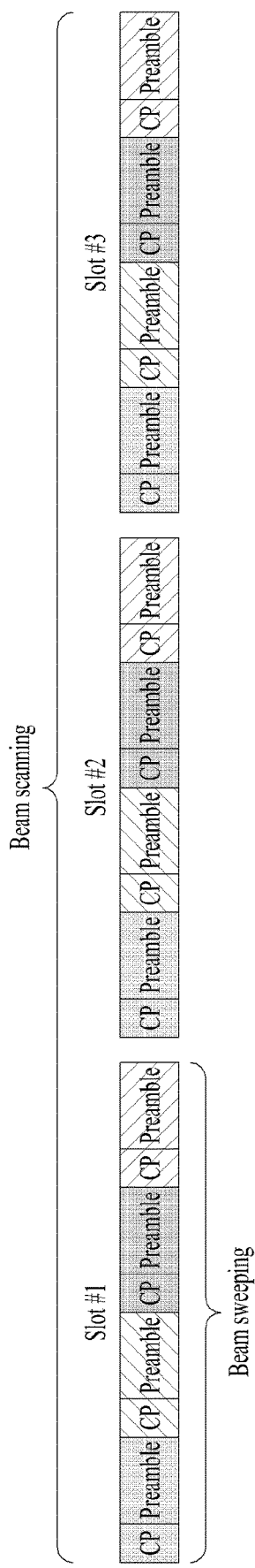
FIG. 13 is a diagram illustrating performing beam scanning after beam sweeping.

FIG. 13 is a diagram illustrating performing beam scanning after beam sweeping.

As described above, the method of performing beam sweeping after beam scanning may reduce the degree of freedom of scheduling of the base station. In order to address the above-described issue, beam sweeping may be performed first. However, the issue is not completely addressed by performing beam sweeping first. Accordingly, in allocating RACH resources for beam scanning, RACH resources in units of slots may be allocated even if the resources are not concatenated in order to configure a reception beam direction of the base station a slot-by-slot basis. In this case, the RACH preambles may be transmitted while the degree of freedom of scheduling of the base station is maintained. To this end, the base station may inform the UE of a method for configuring RACH resources in one slot (or multiple slots due to the configuration of the RACH signal).

For example, referring to FIG. 13, for beam sweeping of a UE, a RACH resource may be configured to transmit a RACH signal composed of a CP and a preamble four times. And the base station may inform the UE of a slot in which the configured RACH resource is to be transmitted. For example, the base station may signal a specific SFN, which is a starting point, in a bitmap, or may signal the number of transmissions having a specific SFN as a starting point, assuming that transmissions are performed in consecutive slots. The above methods may be applied to the method of beam acquisition through allocation of multiple RACH resources described above.

According to an embodiment, the base station may allocate CSI-RS configuration based on the best RSRP. For example, the base station may allocate resources to the UE based on the allocated SSB, and the UE may perform handover completion and beam recovery through the allocated resources for beam recovery.

In the handover operation, when a beam management CSI-RS is delivered, a contention-free RACH procedure may be performed in a manner that one resource for CF-RACH is allocated on the assumption that beam acquisition is completed. When the CF-RACH resource is not a suitable beam or the quality of the allocated beam failure detection RS is less than or equal to a threshold (e.g., $Q_{out}$), the UE may declare beam failure and transmit a beam recovery RS. In addition, when no response to the RACH preamble is received from the base station, the UE may perform beam recovery through a new candidate beam RS. For example, when the UE assigned a CF-RACH resource transmits a RACH preamble to the base station, but there is no response to the RACH preamble within a set or predefined time, the UE may perform beam recovery using the beam recovery RS.

In the case where multiple CF-RACH resources are allocated for handover, the base station may allocate a set of multiple beam management RSs and select a beam management RS through the RACH response. Alternatively, according to an embodiment, the base station may transmit a beam management RS to the UE through the RACH response without allocating a beam management RS set.

A CF-RACH resource may be used and/or a beam recovery signal may be transmitted so as to be assigned a beam management RS or select a beam management RS. Further, as described above, the beam recovery signal may be used to transmit a RACH signal for handover completion. For example, the beam recovery signal may be used in place of a contention-free RACH, and deliver a response using a BR-RACH resource.

In addition, when both contention-free random access (CF-RA) and beam recovery random access (BR-RA) are configured, the UE may receive a TA through CF-RA and acquire a beam through BR-RA, and then update the BM-RS resource. Alternatively, when BR-RA is configured without CF-RA configured, the UE may transmit a message indicating handover completion using BR-RA. At this time, the UE may apply 0 as a TA value.

Method for Utilizing Resources for Beam Recovery in Handover Operation

The contention-free RACH procedure discussed above basically represents a method for acquiring an initial beam for a target cell through the handover operation. In the handover operation, the base station may allocate a reference signal (e.g., BM-RS) for beam management/tracking based on the beam quality of the target cell previously reported through a measurement report. Here, the BM-RS may be allocated through a handover command. For example, the handover command may be transmitted through an RRC reconfiguration message.

In addition, when a beam failure occurs in the beam management operation, in order to perform beam recovery, the base station May allocate, to the UE, a new candidate beam identification RS for identifying or searching for a new candidate beam, and RACH resources for reporting a beam failure status and a new suitable beam to the base station. Here, the beam failure may indicate that the channel quality of all beams configured as serving beams fails to satisfy a predetermined condition. According to an embodiment, it may indicate that a channel quality measured based on a reference signal representing the beams fails to satisfy the predetermined condition. The RACH resource may be referred to as a RACH resource for beam recovery or a beam recovery RACH (BR-RACH) resource, and is not limited to the above-described example. Hereinafter, for simplicity, a RACH allocated for beam recovery will be referred to as a BR-RACH, and an RS allocated for beam recovery will be referred to as a beam recovery-RS (BR-RS).

In general, in the case of a BR-RACH signal, the base station needs to minimize the time required for beam recovery by allocating a separate BR-RACH resource for each user. The base station may constantly monitor the BR-RACH signal, and may allocate an uplink transmission resource and a new downlink BM-RS resource to the UE at the request for beam recovery from the UE in order to determine an exact beam quality status.

Allocating a UE dedicated resource means that the UE always secures a resource for reporting a new beam status exclusively to a target cell through a handover command. A resource allocated for beam recovery may be used to report occurrence of beam failure and a new suitable beam to the base station and to adjust a new timing advance (TA) value. In addition, a resource allocated for handover may be used for the UE to transmit a handover response upon receiving a handover command from the base station, report a new serving beam to the base station, and acquire a new TA value. That is, the use of the resource allocated for handover may be similar to the use of the resource allocated for beam recovery. Accordingly, when the characteristics of the BR-RACH resource allocated to the UE are similar to those of the resource for a contention-free RACH or contention-based RACH procedure, the BR-RACH resource may be used in the handover operation as a RACH resource for completing handover. For example, the characteristics of the RACH resource may a timing advance (TA) value equal to 0. Although 0 is generally used to indicate that the TA value is 0, another fixed value may also be used depending on the characteristics of the system.

In the present disclosure, it is proposed that the BR-RACH resource be used as a contention-free/contention-based RACH resource for handover, or as a resource for beam update, report, or confirmation in the handover operation. Accordingly, according to the present disclosure, a resource allocated for beam recovery may be used in transmitting a handover-related message, and a separate UE dedicated resource may not be allocated for handover. Hereinafter, a scheme of using the BR-RACH resource to transmit a handover response and a scheme of using the BR-RACH to report the best beam to the base station will be described in detail. According to an embodiment, transmitting a handover response may be referred to as transmitting a handover response message.

1) Using the BR-RACH resource as a RACH resource for a handover response

In the contention-free RACH procedure, the base station may allocate a contention-free based RACH (CF-RACH) resource to the UE based on a measurement report. In this case, the base station may allocate multiple CF-RACH resources to the UE. In the current 3GPP NR system, in order for the UE to perform initial beam acquisition and report an acquired beam, when the base station configures RACH resources, a RACH resource linked to an SS/PBCH block (SSB) may be configured. Accordingly, the base station may allocate multiple CF-RACH resources to the UE, and the UE may transmit a RACH signal using a CF-RACH resource linked to an SSB, which is determined to be suitable as a serving beam for the target cell.

When there is no CF-RACH resource linked to the SSB that is determined to be suitable as a serving beam, the UE transmits a RACH signal for handover to the base station using a contention-based RACH (CB-RACH), thereby performing initial beam acquisition for the target cell.

When the UE is allowed to use a BR-RACH resource as CF-RACH and/or CB-RACH resources, the base station may allocate a BR-RACH resource to the UE through a handover command, and may not allocate separate CF-RACH and/or CB-RACH resources for handover. In general, the BR-RACH resource may be used for the UE to detect a new serving beam and report the new serving beam to the base station, and the CF-RACH and CB-RACH resources may be used to indicate completion of handover and a new beam capable of communication. The use of the BR-RACH resource is similar to that of the CF-RACH and/or CB-RACH resources. Accordingly, when the BR-RACH resource is allowed to be used as the CF-RACH resource and/or CB-RACH resource, a separate CF-RACH resource and/or CB-RACH resource may not need to be used in the handover operation.

In addition, the BR-RACH may be linked to the BR-RS, which is a resource for measuring beam quality, in order to detect and report a new serving beam. Accordingly, as a resource for finding a suitable serving beam and a resource for setting transmission power of the BR-RACH, the BR-RS, not the SSB of a target cell, may be used for beam quality measurement. According to an embodiment, the BR-RS may include the SSB of the target cell. The base station may transmit resource configuration information about the BR-RS to the UE through a handover command.

However, depending on the environment managed by the base station, a BR-RACH signal may be configured to be transmitted by applying a TA value set before a beam failure occurs, in order to secure a large number of BR-RACH resources. Here, since the BR-RACH resource has different characteristics from the RACH resource for handover, the BR RACH resources cannot be used as RACH resources for handover. Accordingly, in allocating BR-RACH resources, the base station may inform the UE of whether the BR RACH resources can be used as RACH resources for handover. In addition, when a CF-RACH resource is not separately allocated, it may be pre-configured that BR-RACH resources can be used as CF-RACH resources.

According to an embodiment, since whether to apply the TA value may be determined differently for each BR-RACH resource, the BR-RACH resources may be used only for some beams. CF RACH, CB RACH, and BR RACH resources may all be allocated to one beam. The CF RACH, CB RACH, and BR-RACH resources may be used as RACH resources for handover according to a configured priority. For example, when the BR-RACH resource is available as a RACH resource for handover, the priority may be configured in the order of CF-RACH, BR RACH, and CB RACH. Alternatively, when both the CF-RACH resource and the BR-RACH resource are allocated for one beam, the CF-RACH resource and the BR-RACH resource may have the same the priority, and the UE may inform the base station of completion of the handover along with the best beam information, using the resource that is determined to have the lowest latency.

Figure 14:
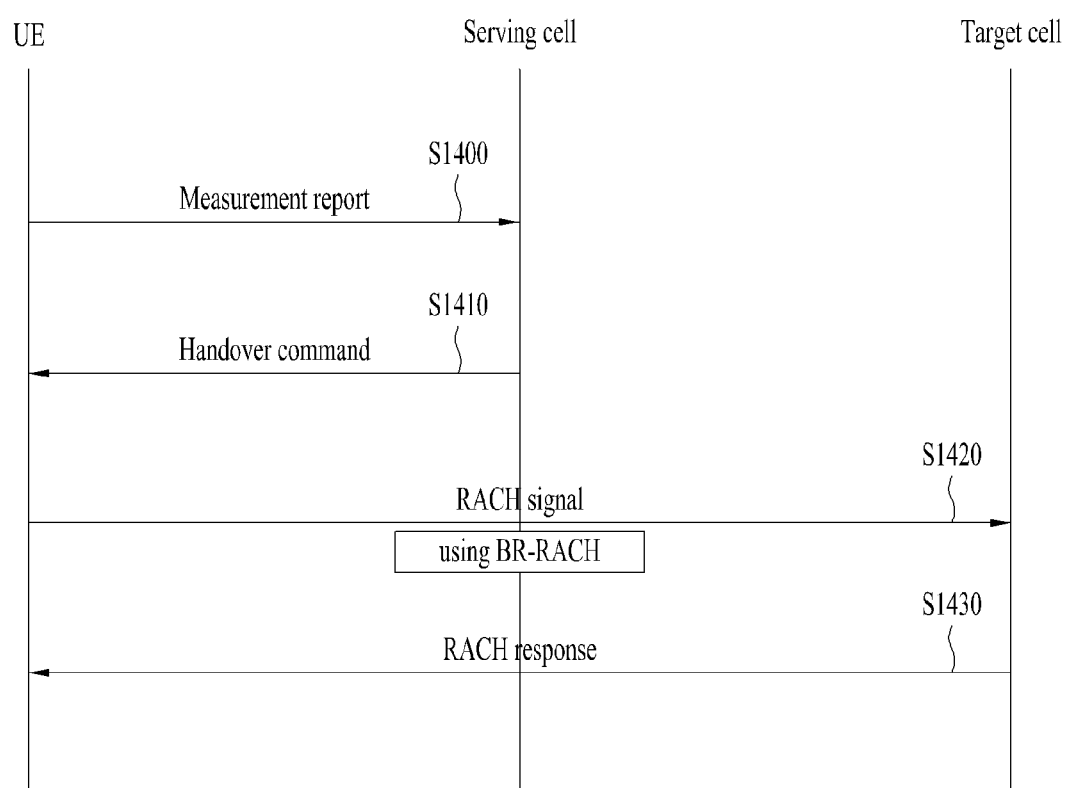
FIG. 14 is a flowchart illustrating a method for transmitting a RACH for handover using a BR-RACH resource.

FIG. 14 is a flowchart illustrating a method for transmitting a RACH for handover using a BR-RACH resource according to an embodiment.

Referring to FIG. 14, in S1400, the UE may transmit a measurement report containing information about RSRP/RSRQ for each cell to a serving cell. The serving cell may transmit a handover command to the UE based on the measurement report received from the UE (S1410). The handover command may contain information about a target cell to which the UE will move through handover. The UE may transmit a RACH signal for handover to the target cell in response to the received handover command (S1420). Here, the RACH signal may be transmitted through a RACH resource allocated for beam recovery. The target cell may transmit a RACH response to the UE in response to the RACH signal received from the UE (S1430). Accordingly, a handover operation may be performed using the RACH resource (e.g., BR-RACH) for beam recovery without a separate RACH resource allocated for handover.

2) Transmitting serving beam confirmation or serving beam report/update information based on a BR-RACH resource after transmitting a RACH signal for handover In the CF-RACH procedure, the UE may report information about which beam is the serving beam to the base station based on a CF-RACH resource (or a CB-RACH resource when necessary). However, allocating multiple CF-RACH resources means that the base station has only uncertain information about which beam is suitable as a serving beam. Accordingly, when the base station transmits a handover command to the UE, it may be inefficient to allocate a BM-RS set to the UE. In this case, the base station should provide the UE with RRC signaling for configuring a BM-RS after receiving a RACH signal (for example, a RACH preamble) from the UE. To perform proper beam management, the UE may transmit the RACH signal based on a RACH resource having the best RSRP. However, when the RACH signal is transmitted based on the RACH resource having the best RSRP, the RACH resource having the best RSRP should be awaited to transmit the RACH signal although the handover may be completed more quickly through other RACH resources capable of reducing the handover delay.

Accordingly, in the present disclosure, in an environment in which the handover RACH procedure cannot be performed based on a BR-RACH resource, a method for transmitting information for serving beam confirmation or serving beam report/update to the base station based on a BR-RACH resource is proposed.

Figure 15:
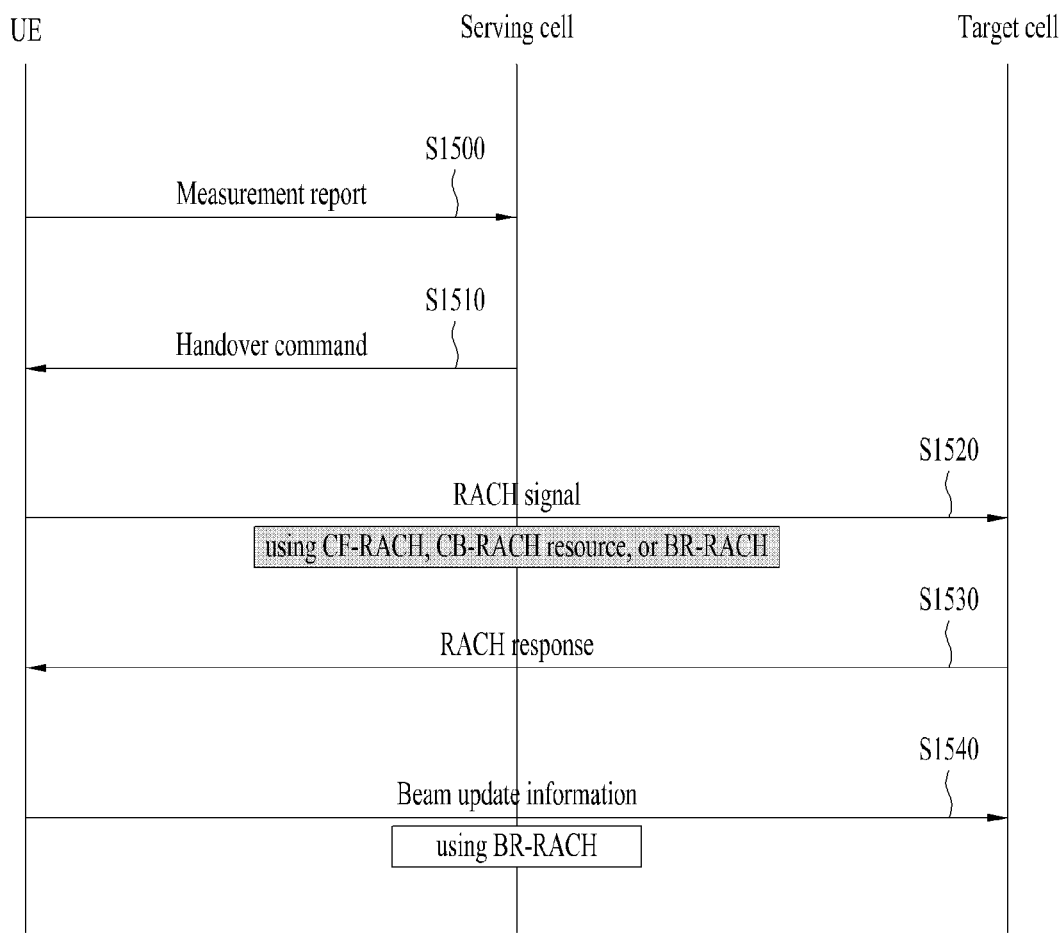
FIG. 15 is a flowchart illustrating a method for transmitting serving beam confirmation or serving beam report/update information based on a BR-RACH resource.

FIG. 15 is a flowchart illustrating a method for transmitting serving beam confirmation or serving beam report/update information based on a BR-RACH resource according to an embodiment.

Referring to FIG. 15, in S1500, the UE may transmit a measurement report containing information about RSRP/RSRQ for each cell to the serving cell. The serving cell may transmit a handover command to the UE based on the measurement report received from the UE (S1510). Here, the handover command may contain information about a target cell to which the UE is to move through handover. The UE may transmit a RACH signal for handover to the target cell in response to the handover command received from the serving cell (S1520). The RACH signal for handover may be transmitted through a CF-RACH resource or CB-RACH resource allocated for handover, or may be transmitted through a BR-RACH resource. Here, the RACH signal for handover may be transmitted through the best RACH resource in terms of handover delay rather than a RACH resource having the best RSRP, thereby minimizing the delay caused by the handover operation. The target cell may transmit a RACH response in response to the RACH signal received from the UE (S1530). Then, the UE may transmit serving beam confirmation information or serving beam report/update information, which is intended to indicate the best beam, to the target cell. Here, the serving beam confirmation information or the serving beam report/update information may be transmitted through a BR-RACH resource. Accordingly, in terms of handover delay, transmitting the handover response using the best beam may minimize the delay caused by the handover operation. In addition, as the best beam information is delivered through the BR-RACH resource after the handover response is transmitted, communication may be performed through a better quality beam.

In general, beam failure may be declared by the UE in a situation in which communication through serving beams is impossible. When the beam failure occurs, the UE may update the serving beam set through a beam recovery procedure. In addition, in order to reduce the handover delay, the UE may transmit a response to the handover command through the best RACH resource in terms of delay, rather than a RACH resource having the best RSRP. Here, the response to the handover command may be transmitted through the CF-RACH resource or the CB-RACH resource, or may be transmitted through the BR-RACH resource as suggested in 1). However, when the response to the handover command is transmitted through the best RACH resource in terms of delay, the UE may need to communicate with the base station using a quasi-best beam until a beam failure occurs and the best serving beam is reconfigured.

In order to address the above-mentioned the issue, in transmitting the response to the handover command is transmitted, the UE transmits a response message to the handover command to the base station through a RACH resource that minimizes the handover delay. Here, the RACH resource that minimizes the handover delay may refer to a resource on which the quality of the SSB or BR-RS satisfies the quality required by the service of the UE. Further, even when a beam failure does not occur, the UE may transmit beam update information to the base station through a BR-RACH resource corresponding to the best quality beam found in advance or through the best quality beam found through beam measurement after receiving a handover command.

If the base station receives the beam update information from the UE, and the beam indicated by the beam update information is identical to the beam reported through the handover response, the base station may recognize that the serving beam is confirmed. This may correspond to a case where the UE transmits the handover response through one CF-RACH resource as in Method 2-2) described above, and the base station may transmit a BM-RS to the UE through a handover command.

Alternatively, if the beam indicated by the beam update information is different from the beam reported through the handover response, the base station may allocate a BM-RS resource for a new serving beam to the UE, recognizing that new serving beam report/update information is received through the BR-RACH resource. According to an embodiment, the base station may pre-allocate all beam-specific BM-RS resources to the UE through the handover command, and determine a BM-RS resource corresponding to the serving beam reported through a BR-RACH resource as a BM-RS to be used thereafter. Then, the UE may communicate with the base station using the beam indicated through the RACH for handover between the time when the UE transmits the RACH signal for handover and the time when the base station receives the new serving beam report/update information through the BR-RACH resource and completes the BM-RS configuration. Accordingly, a service interruption time may be minimized. The above-described method may be suitable for a service requiring a very short handover delay or a service interruption time close to zero.

As such, a beam recovery operation may be defined for a case where the beam failure does not occur (for example, a beam having a better quality is found even if the quality of the serving beam does not raise an issue in performing communication). Alternatively, even if a new beam recovery operation is not defined, it may be advantageous in terms of service quality to define the above-described beam recovery operation in the handover operation for a predetermined time or a certain time set by the base station after the UE receives a handover command from the base station.

Additionally, as mentioned in 1), when the configured BR-RACH resource requires TA, the UE may receive a TA value through a RACH response. Then, the UE may transmit serving beam update information to the base station through the BR-RACH resource. For example, the UE may transmit a RACH signal (e.g., RACH preamble), wait for a RACH response while monitoring a new beam, and receive a TA value as a RACH response. Then, the UE may transmit serving beam update information through a BR-RACH resource corresponding to the best beam. However, in the case of the CB-RACH procedure, even when the TA value is received, the contention resolution is not completed. Accordingly, the UE may transmit the serving beam update information after transmitting a contention resolution message (e.g., RACH message 4).

Figure 16:
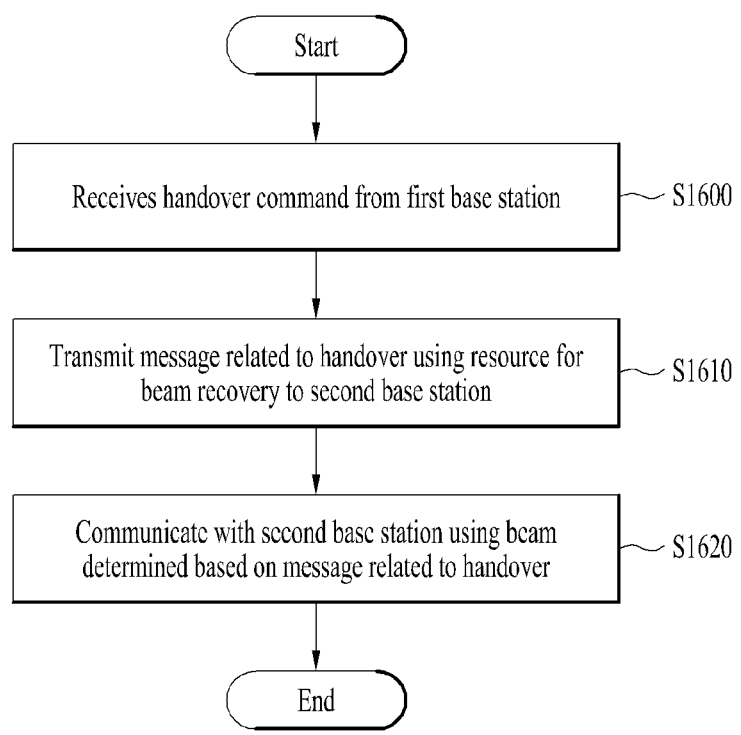
FIG. 16 is a flowchart illustrating a method for performing handover by a UE.

FIG. 16 is a flowchart illustrating the operation of a UE in the handover operation.

Referring to FIG. 16, a UE according to an embodiment receives a handover command from a first base station (S1600). Then, in response to the received handover command, the UE may transmit a message related to handover to a second base station through a resource for beam recovery (S1610). Here, the first base station may refer to the above-described serving cell and the second base station may refer to the target cell. The message related to handover may include at least one of a RACH signal for handover or beam update information. Further, the resource for beam recovery may include a RACH resource allocated for beam recovery.

When the UE transmits the beam update information through the resource allocated for beam recovery, the beam update information may be transmitted separately from the RACH signal for handover. For example, the UE may transmit the RACH signal for handover to the second base station through a CF-RACH, CB-RACH, or BR-RACH resource allocated for handover, and receive a RACH response from the second base station. Here, the resource used to transmit the RACH signal may be a resource with the lowest handover delay, even if it is not the best quality beam. Accordingly, the UE may minimize delay occurring in the handover operation.

The UE may additionally transmit information about the best beam to the second base station. At this time, the UE may transmit beam update information to the second base station through a resource allocated for beam recovery. For example, when the best beam indicated by the beam update information is identical to the beam indicated by the RACH signal, the beam update information may represent serving beam confirmation information. However, when the best beam indicated by the beam update information is different from the beam indicated by the RACH signal, the beam update information may represent serving beam report/update information. As the beam update information is delivered to the second base station, the UE and the second base station may perform communication using the beam indicated by the beam update information. Accordingly, the UE and the second base station may perform communication more quickly using the best beam while reducing the delay occurring in the handover operation.

Accordingly, the UE may utilize the resource allocated for beam recovery in the handover operation, and thus may not be allocated a separate resource for handover.

When the characteristics of the resource allocated for beam recovery are different from the characteristics of a resource allocated for handover (e.g., CF-RACH resource and CB-RACH resource), it may be difficult to utilize the resource allocated for beam recovery. Accordingly, the first base station may pre-transmit to the UE information indicating whether the resource allocated for beam recovery is available for transmission of a message related to handover.

Figure 17:
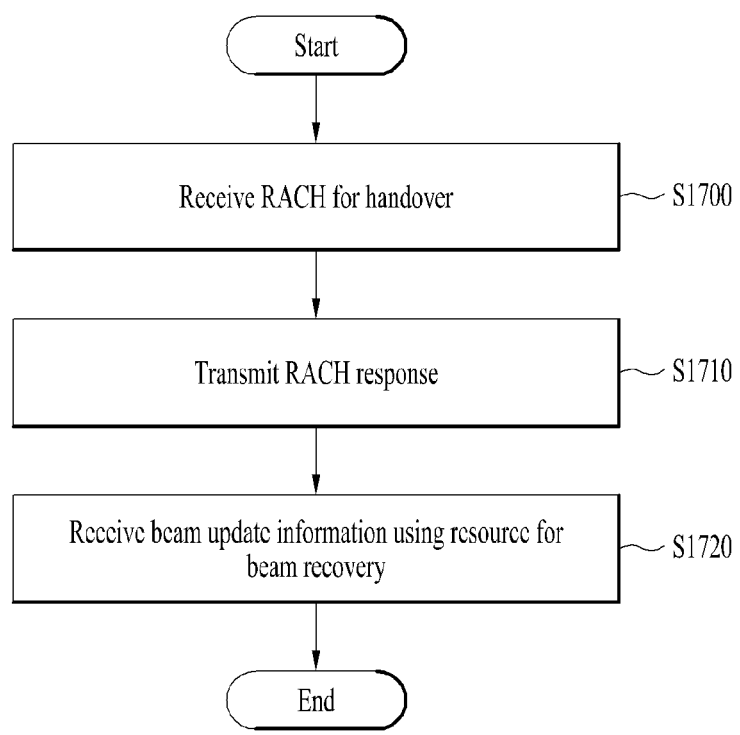
FIG. 17 is a flowchart illustrating an operation of a target cell in the handover operation.

FIG. 17 is a flowchart illustrating an operation of a target cell in the handover operation.

In order for the UE to perform handover from the first base station to the second base station, the first base station may transmit a handover command to the UE, and the UE may transmit a RACH signal for handover to the second base station. The second base station may receive the RACH signal transmitted from the UE (S1700). The RACH signal may be transmitted through a resource allocated for handover (e.g., CB-RACH or CF-RACH resource), or a resource allocated for beam recovery. Here, the RACH signal may be transmitted through a resource having the lowest handover delay, not the best beam having the best quality. Thereby, the handover may be completed more quickly.

The second base station may transmit a RACH response to the UE in response to the RACH signal received from the UE (S1710). Here, when the RACH resource is transmitted through a resource having the lowest handover delay, the second base station and the UE may temporarily perform communication using a quasi-best beam. Accordingly, the second base station may receive beam update information from the UE (S1720), wherein the beam update information may be transmitted through a resource allocated for beam recovery (e.g., a BR-RACH resource). The beam update information may include information about the best beam. As the beam update information is transmitted, the second base station and the UE may perform communication using the best beam indicated by the beam update information.

Figure 18:
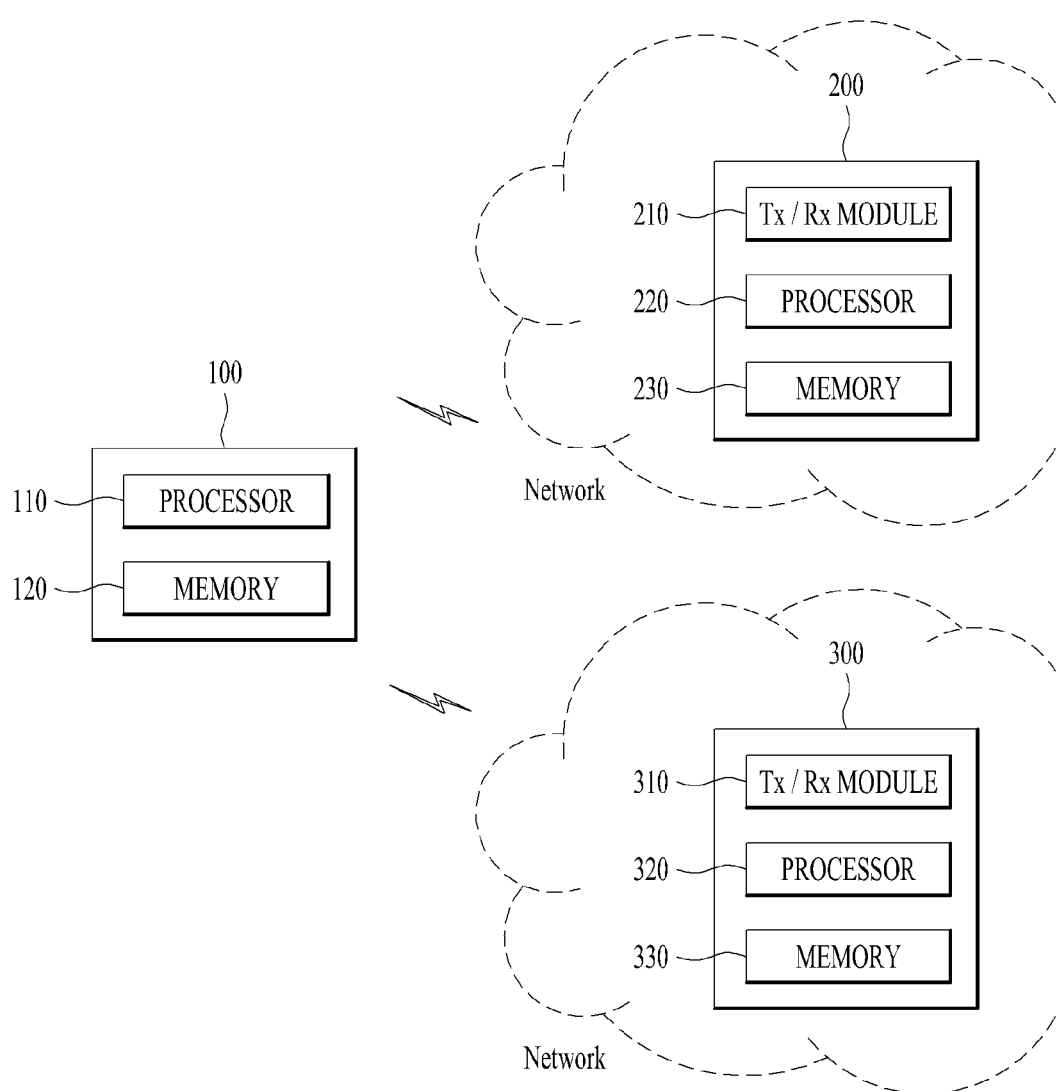
FIG. 18 is a diagram illustrating configuration of devices according to the present disclosure.

Alternatively, when the RACH signal is transmitted through the resource allocated for beam recovery, and a beam corresponding to the resource allocated for beam recovery is the best beam, the second base station does not need to receive beam update information separately from the UE. FIG. 18 is a diagram illustrating configuration of devices according to the present disclosure.

A device 100 according to a proposed embodiment may include a processor 110 and a memory 120. The device 100 may include the above-described user equipment (UE) or a System on Chip (SoC), but is not limited thereto. For example, when the device 100 includes a UE, the device 100 may further include a transceiver (not shown). The processor 110 may control the overall operation of the device 100 and may be configured to function to perform operational processing of information that the device 100 transmits and receives to and from an external device. In addition, the processor 120 may be configured to perform the operation of the UE 100 proposed in the present disclosure. When the device 100 includes a transceiver, the processor 120 may control the transceiver to transmit data or a message according to the proposal of the present disclosure.

The memory 120 may store computationally processed information and the like for a predetermined time, and may be replaced with a component such as a buffer (not shown).

The transceiver may be referred to as a radio frequency (RF) unit or a transmission/reception module. The transceiver may be configured to transmit various signals, data and information to external devices and to receive various signals, data and information from external devices. Alternatively, the transceiver may be implemented as a transmitter and a receiver separated from each other. The device 100 may be connected to an external device in a wired and/or wireless manner.

Referring to FIG. 18, a first base station 200 according to an embodiment may include a transceiver 210, a processor 220, and a memory 230. For example, the first base station 200 may perform the operation of the x serving cell or source cell described above. In communicating with the device 100, the transceiver 210 may be referred to as a transmission/reception module or a radio frequency (RF) unit. The transceiver 210 may be configured to transmit various signals, data and information to external devices and to receive various signals, data and information from external devices. The first base station 200 may be connected to an external device in a wired and/or wireless manner. The transceiver 210 may be implemented as a transmitter and a receiver separated from each other. The processor 220 may control the overall operation of the first base station 200, and the first base station 200 may be configured to function to perform computational processing of information to be transmitted and received to and from the external device. Further, the processor 220 may be configured to perform the operation of the first base station 200 proposed in the present disclosure. The processor 220 may control the transceiver 210 to transmit data or a message to the device 100 or another base station according to the proposal of the present disclosure. The memory 230 may store computationally processed information for a predetermined time, and may be replaced with a component such as a buffer (not shown). In the access network, the first base station 200 may be an eNB or a gNB.

In addition, a second base station 300 according to an embodiment may include a transceiver 310, a processor 320, and a memory 330. For example, the second base station 300 may perform the operation of the target cell described above.

In addition, the specific configuration of the device 100, the first base station 200, and the second base station 300 may be implemented such that the details described in various embodiments of the present disclosure described above are applied independently or two or more embodiments are applied at the same time. Redundant description will be omitted for clarity.

The above-described embodiments of the present disclosure may be implemented through various means. For example, the embodiments of the present disclosure may be implemented by hardware, firmware, software, or a combination thereof.

When implemented by hardware, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

When implemented by firmware or software, the embodiments of the present disclosure may be configured in the form of a module, a procedure, a function, or the like to perform the functions or operations described above. Software code may be stored in a memory unit and executed by a processor. The memory unit is located inside or outside the processor, and may exchange data with the processor by various known means.

The detailed description of exemplary embodiments of the present disclosure has been provided to enable those skilled in the art to implement and practice the disclosure. Although exemplary embodiments of the present disclosure have been described above, it will be appreciated by those skilled in the art that various modifications and changes may be made in the present disclosure without departing from the spirit and scope of the present disclosure as set forth in the claims below. Accordingly, the present disclosure is not intended to be limited to the embodiments presented herein, but to be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a mmWave communication system using an ultra-high frequency band.

The invention claimed is:

1. A method for performing handover by a user equipment (UE) in a wireless communication system, the method comprising:
  receiving, from a first base station, a handover command including configuration information for allocating resources for beam recovery,
  wherein the configuration information includes information about whether the resources for the beam recovery are available for transmission of a handover complete message;
  transmitting, to a second base station, the handover complete message based on one among the resources for the beam recovery; and
  performing communication with the second base station based on completion of the handover.

2. The method of claim 1, the handover complete message includes radio resource control (RRC) reconfiguration complete message.

3. The method of claim 1, wherein dedicated resources for the handover are not allocated.

4. The method of claim 1, wherein the at least one of the resources for the beam recovery is used as a contention-free based RACH resource or a contention-based RACH resource for the handover.

5. The method of claim 1, wherein the handover complete message is transmitted based on a resource with a lowest handover delay among the resources for the beam recovery.

6. The method of claim 1, wherein the handover is performed through a contention-free based random access channel (RACH).

7. The method of claim 1, wherein the resource for the beam recovery comprises a random access channel (RACH) resource for the beam recovery.

8. The method of claim 1, wherein the resource for the beam recovery is allocated as a UE dedicated resource through the handover command.

9. An apparatus for performing handover in a wireless communication system, the apparatus comprising:
  a memory; and
  a processor connected to the memory,
  wherein the processor is configured to:
  receive, from a first base station, a handover command including configuration information for allocating resources for beam recovery,
  wherein the configuration information includes information about whether the resources for the beam recovery are available for transmission of a handover complete message;
  transmit, to a second base station, the handover complete message based on one among the resources for the beam recovery; and
  perform communication with the second base station based on completion of the handover.

* * * * *